United States Patent
Hu (10) Patent No.: US 12,388,924 B2
(45) Date of Patent: Aug. 12, 2025

(54) INTERFACE DISPLAY METHOD AND ELECTRONIC DEVICE

(71) Applicant: VIVO MOBILE COMMUNICATION CO., LTD., Guangdong (CN)

(72) Inventor: Jinqi Hu, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 491 days.

(21) Appl. No.: 17/748,104

(22) Filed: May 19, 2022

(65) Prior Publication Data

US 2022/0279064 A1 Sep. 1, 2022

Related U.S. Application Data (63) Continuation of application No. PCT/CN2020/130775, filed on Nov. 23, 2020.

(30) Foreign Application Priority Data

Nov. 27, 2019 (CN) .......................... 201911184572.9

(51) Int. Cl.
*H04M 1/72469* (2021.01)
*H04M 1/72454* (2021.01)

(52) U.S. Cl.
CPC .................. *H04M 1/72454* (2021.01); *H04M 1/72469* (2021.01)

(58) Field of Classification Search
CPC ............. H04M 1/724; H04M 1/72454; H04M 1/72469
See application file for complete search history.

(56) References Cited

U.S. PATENT DOCUMENTS

| 10,126,905 B2 | 11/2018 | Choi et al. |
| 2015/0205456 A1 | 7/2015 | Ji et al. |
| 2016/0071241 A1 | 3/2016 | Karunamuni et al. |
| 2017/0249076 A1* | 8/2017 | Smith .................. G06F 3/0482 |
| 2018/0181999 A1 | 6/2018 | Kim et al. |

(Continued)

FOREIGN PATENT DOCUMENTS

| CN | 102855051 A | 1/2013 |
| CN | 103677521 A | 3/2014 |

(Continued)

OTHER PUBLICATIONS

Second Office Action regarding Japanese Patent Application No. 2022-528926, dated Dec. 6, 2023. Translation provided by Bohui Intellectual Property.

(Continued)

*Primary Examiner* — Jinsong Hu
*Assistant Examiner* — Farideh Madani
(74) *Attorney, Agent, or Firm* — Harness, Dickey & Pierce, P.L.C.

(57) ABSTRACT

An interface display method includes: receiving a first input performed by a user in a case that an electronic device is in a landscape state and displays a first interface of a first application; and displaying, in response to the first input, a notification bar interface and displaying N first icons in a first region, wherein the notification bar interface includes the first region and a second region, the second region is configured to display a notification message, and a first icon is configured to indicate a first object.

9 Claims, 6 Drawing Sheets

(56) References Cited

U.S. PATENT DOCUMENTS

| | | |
|---|---|---|
| 2018/0210629 A1 | 7/2018 | Loi et al. |
| 2019/0354256 A1 | 11/2019 | Karunamuni et al. |
| 2021/0405828 A1* | 12/2021 | Jiang .................. G06Q 30/0633 |

FOREIGN PATENT DOCUMENTS

| | | |
|---|---|---|
| CN | 105264476 A | 1/2016 |
| CN | 105677167 A | 6/2016 |
| CN | 105912285 A | 8/2016 |
| CN | 107493369 A | 12/2017 |
| CN | 107835322 A | 3/2018 |
| CN | 108170342 A | 6/2018 |
| CN | 108415751 A | 8/2018 |
| CN | 110456951 A | 11/2019 |
| CN | 111049976 A | 4/2020 |
| TW | 201828034 A | 8/2018 |
| WO | WO-2010125451 A1 | 11/2010 |
| WO | WO-2016039863 A1 * | 3/2016 ........... G06F 1/1694 |

OTHER PUBLICATIONS

Supplementary European Search Report regarding European Patent Application No. 20892424.1-1224, dated Dec. 9, 2022.

First Office Action regarding Indian Patent Application No. 202217035749, dated Nov. 9, 2022.

First Office Action regarding Japanese Patent Application No. 2022-528926, dated May 29, 2023. Translation provided by Bohui Intellectual Property.

International Search Report and Written Opinion of the International Searching Authority regarding International Patent Application No. PCT/CN2020/130775, dated Mar. 1, 2021. Translation provided by Bohui Intellectual Property.

First Office Action regarding Chinese Patent Application No. 201911184572.9, dated Oct. 12, 2020. Translation provided by Bohui Intellectual Property.

* cited by examiner

INTERFACE DISPLAY METHOD AND ELECTRONIC DEVICE

CROSS-REFERENCE TO RELATED APPLICATIONS

This application is a Bypass Continuation Application of PCT/CN2020/130775 filed on Nov. 23, 2020, which claims priority to Chinese Patent Application No. 201911184572.9 filed on Nov. 27, 2019, which are incorporated herein by reference in their entirety.

TECHNICAL FIELD

Embodiments of the present application relate to the field of communication technologies, and in particular, to an interface display method and an electronic device.

BACKGROUND

With the development of electronic device technologies, to help a user check a notification message, the user is allowed to quickly check the notification message through a notification bar in a screen of an electronic device.

Currently, the notification bar is usually hidden in a screen of an electronic device, to check a notification message in the notification bar, a user may swipe down from a top edge of the screen to pull out the notification bar.

However, in a case that the electronic device is in a landscape state, the notification message in the notification bar is usually displayed in the form of a list in the middle region of the notification bar. Consequently, the blank area of the notification bar is wasted, resulting in a low layout space utilization of the notification bar.

SUMMARY

According to a first aspect, the embodiments of the present application provide an interface display method, including:
  receiving a first input performed by a user in a case that an electronic device is in a landscape state and displays a first interface of a first application; and
  displaying, in response to the first input, a notification bar interface and N first icons in a first region, wherein the notification bar interface includes the first region and a second region, the second region is configured to display a notification message, a first icon is configured to indicate a first object, and N is a positive integer.

According to a second aspect, the embodiments of the present application further provide an electronic device, including:
  a receive module, configured to receive a first input performed by a user in a case that an electronic device is in a landscape state and displays a first interface of a first application; and
  a display module, configured to display a notification bar interface and N first icons in a first region in response to the first input received by the receive module, wherein
  the notification bar interface includes the first region and a second region, the second region is configured to display a notification message, a first icon is configured to indicate a first object, and N is a positive integer.

According to a third aspect, the embodiments of the present application provide an electronic device, including a processor, a memory, and a computer program stored in the memory and executable on the processor, wherein when the computer program is executed by the processor, steps of the interface display method as described in the first aspect are implemented.

According to a fourth aspect, the embodiments of the present application further provide a non-transitory computer-readable storage medium, storing a computer program, wherein when the computer program is executed by a processor, steps of the interface display method as described in the first aspect are implemented.

DETAILED DESCRIPTION

The following clearly describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application shall fall within the protection scope of this application.

It should be noted that "I" herein means "or". For example, A/B may represent A or B. "And/or" herein describes only an association relationship between associated objects and represents that three relationships may exist. For example, A and/or B may represent the following three cases: Only A exists, both A and B exist, and only B exists.

It should be noted that "a plurality of" herein refers to two or more.

It should be noted that in the embodiments of the present application, the word, such as "exemplarily" or "for example", is used to represent giving an example, an illustration, or a description. Any embodiment or design scheme described with "exemplarily" or "for example" in the embodiments of the present application should not be explained as being more preferred or having more advantages than another embodiment or design scheme. Exactly, use of the word, such as "exemplarily" or "for example", is intended to present a related concept in a specific manner.

It should be noted that for ease of describing the technical solutions in the embodiments of the present application clearly, in the embodiments of the present application, words, such as "first" and "second", are used to distinguish same or similar items with basically same functions or effects. A person skilled in the art can understand that the words, such as "first" and "second", do not define the amount and the operating sequence. For example, the first input and the second input first are intended to distinguish between different inputs rather than describe a particular order of inputs.

Figure 1:
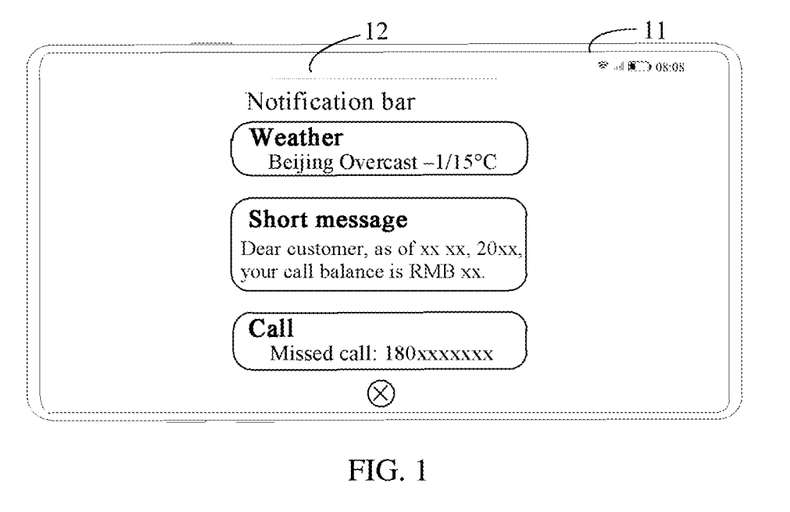
FIG. 1 is a schematic interface diagram of a notification bar interface according to an embodiment of the present application.

In the prior art, in a case that the electronic device is in a landscape state, to check a notification message in a notification bar, a user may pull down the notification bar. In this case, as shown in FIG. 1, a screen (that is, 11 in FIG. 1) of an electronic device displays a notification bar interface (that is, 12 in FIG. 1), and displays three notification messages, namely, a "Weather" notification message, a "Short message" notification message, and a "Call" notification message, in the form of a list in the middle region of the notification bar interface 12.

However, the notification bar interface 12 displays the notification messages only in the middle region, and other blank area is wasted, resulting in a low layout space utilization of the notification bar.

To resolve such a problem, the embodiments of the present application provide an interface display method. After receiving a first input performed by a user, the electronic device displays a notification bar interface including a first region and a second region. Because the first region is configured to display a notification message, and the second region is configured to display a first icon indicating a first object, the notification bar interface can further display an icon in addition to retaining the original function of displaying a notification message, so that the notification bar interface is effectively utilized, thereby avoiding the problem of a low layout space utilization of an existing notification bar of an electronic device in a landscape state.

The interface display method provided in the embodiments of the present application may be performed by the electronic device (including a mobile electronic device and a non-mobile electronic device), or may be performed by a function module and/or a function entity that is in the electronic device and that can implement the interface display method, which may be specifically determined according to actual use requirements, and is not limited in the embodiments of the present application. Using the electronic device as an example, the interface display method provided in the embodiments of the present application is illustrated below.

The electronic device in the embodiments of the present application may be a mobile electronic device or a non-mobile electronic device. The mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a personal computer (PC), a television (TV), an automatic teller machine, a self-service machine, or the like, which is not specifically limited in the embodiments of the present application.

The electronic device in the embodiments of the present application may be an electronic device having an operating system. The operating system may be an Android operating system, an iOS operating system, or another possible operating system, which is not specifically limited in the embodiments of the present application.

Using the Android operating system as an example, a software environment to which the interface display method provided in the embodiments of the present application is applied is described below.

Figure 2:
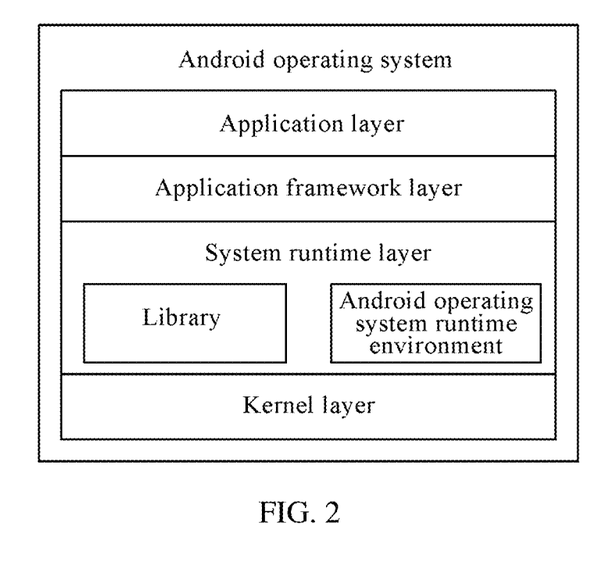
FIG. 2 is a possible schematic architectural diagram of an Android operating system according to an embodiment of the present application.

FIG. 2 is a possible schematic architectural diagram of an Android operating system according to an embodiment of the present application. In FIG. 2, an architecture of the Android operating system includes four layers, namely, an application layer, an application framework layer, a system runtime layer, and a kernel layer (for example, a Linux kernel layer).

The application layer includes applications in the Android operating system (including system applications and third-party applications).

The application framework layer is a framework of an application. Developers may develop some applications based on the application framework layer under the condition of complying with the development principles of the framework of the application.

The system runtime layer includes libraries (also referred to as system libraries) and an Android operating system runtime environment. The libraries mainly provide various resources required by the Android operating system. The Android operating system runtime environment is configured to provide a software environment for the Android operating system.

The kernel layer is an operating system layer of the Android operating system, and belongs to the underlying layer of software layers of the Android operating system. The kernel layer provides core system services and hardware-related drivers for the Android operating system based on the Linux kernel.

Using the Android operating system as an example, in the embodiments of the present application, the developers may develop, based on the system architecture of the Android operating system shown in FIG. 2 above, a software program implementing the interface display method provided in the embodiments of the present application, so that the interface display method is executable based on the Android operating system shown in FIG. 2. That is, the processor or electronic device can implement the interface display method provided in the embodiments of the present application by running the software program in the Android operating system.

Figure 3:
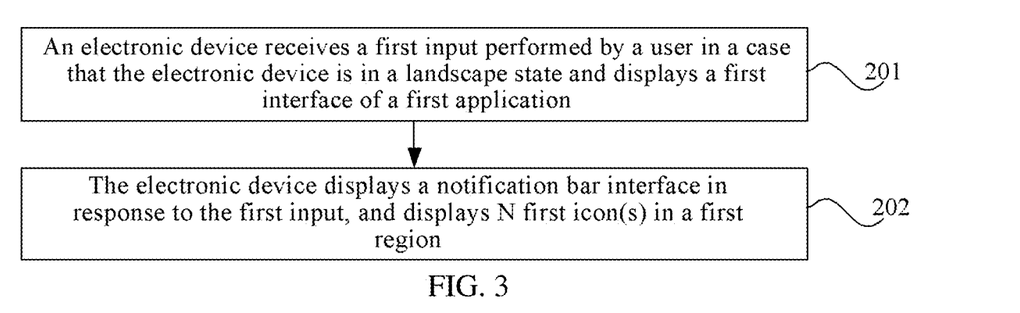
FIG. 3 is a schematic flowchart of an interface display method according to an embodiment of the present application.

With reference to a flowchart of an interface display method shown in FIG. 3, the interface display method in the embodiments of the present application is described. FIG. 3 is a schematic flowchart of an interface display method according to an embodiment of the present application, including step 201 and step 202:

Step 201: An electronic device receives a first input performed by a user in a case that the electronic device is in a landscape state and displays a first interface of a first application.

In this embodiment of the present application, the first input performed by the user may include: a tap input performed by the user on a screen, or a swipe input performed by the user on the screen, or another feasible input performed by the user on the screen, which may be specifically determined according to actual use requirements, and is not limited in the embodiments of the present application.

In the embodiments of the present application, the tap input herein may be a single-tap input, a double-tap input, an input of any quantity of taps, or the like. The tap input may alternatively be a long-press input or a short-press input. The swipe input herein may be a swipe input in any direction, for example, swipe-up, swipe-down, slide-left or swipe-right, and a swiping trajectory of the above swipe input may be a straight line or a curve, which may be specifically set according to actual requirements.

For example, the swipe input performed by the user on the screen may include: a swipe-down input performed by the user on the screen. For example, the user swipes down from a top edge of the screen of the electronic device to pull out a notification bar (a drop-down notification bar for short).

Step 202: The electronic device displays, in response to the first input, a notification bar interface and N first icons in a first region.

In this embodiment of the present application, the notification bar interface includes a first region and a second region. The first region displays N first icons, and the second region is configured to display a notification message. A first icon is configured to indicate a first object, and N is a positive integer.

For example, in step 202, in execution, there is no obvious sequential order between that the electronic device displays the notification bar interface and that the electronic device displays N first icons in the first region. The electronic device may display N first icons on the first region before the electronic device displays the notification bar interface, or after the electronic device displays the notification bar interface, or while the electronic device displays the notification bar interface, which is not limited in the embodiments of the present application.

In addition, the first region can display controls in addition to the first icons. For example, the electronic device may display a video barrage sending control in the first region, that is, use the first region as a video barrage sending entry.

Optionally, in this embodiment of the present application, the first region may be at any position in the notification bar interface, and the second region may be at any position that is in the notification bar interface and that is different from that of the first region, which is not limited in the embodiments of the present application.

For example, the first region may be set in the left region of the notification bar interface, and the second region may be set in the right region of the notification bar interface. Alternatively, the first region may be set in the right region of the notification bar interface, and the second region may be set in the left region of the notification bar interface. Alternatively, the first region may be set in the upper region of the notification bar interface, and the second region may be set in the lower region of the notification bar interface. Alternatively, the first region may be set in the lower region of the notification bar interface, and the second region may be set in the upper region of the notification bar interface. The above may be specifically determined according to actual use requirements, and are not limited in the embodiments of the present application.

In an example, the electronic device may set the left region of the notification bar interface as the second region and the right region of the notification bar interface as the first region. The electronic device may display notification messages in the form of a list in the second region, and may display an application Launcher (desktop application) task in the first region.

Optionally, in this embodiment of the present application, when there are too many first icons, the electronic device may display the first icons in the first region in a paginated manner.

Optionally, in this embodiment of the present application, the first object may include at least one of the following: an application, a multimedia file, or an image. For example, the multimedia file may be audio or a video.

Optionally, in this embodiment of the present application, the first icon may be an icon configured to trigger a multimedia file corresponding to the first icon, or may be a thumbnail configured to trigger an image corresponding to the first icon.

Figure 4:
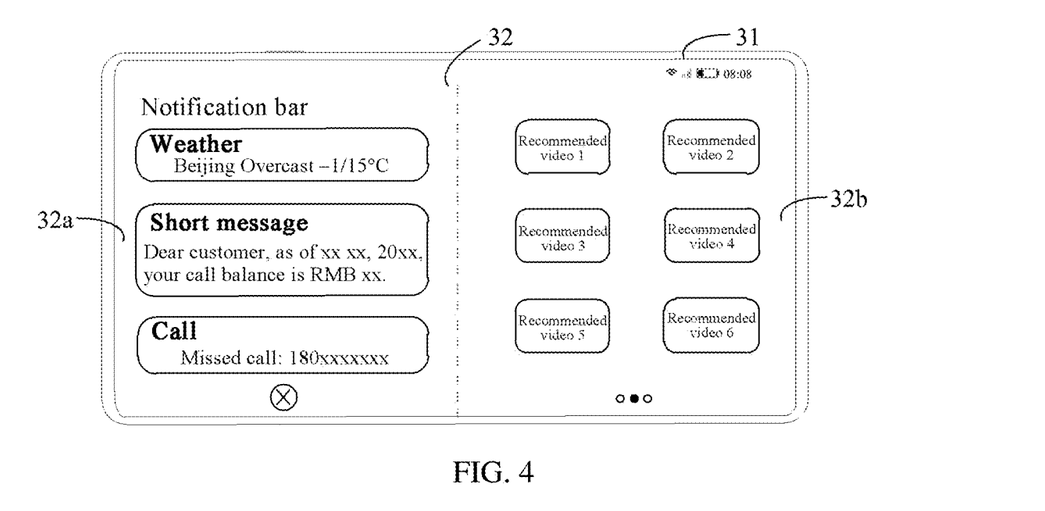
FIG. 4 is a schematic diagram 1 of an interface to which an interface display method is applied according to an embodiment of the present application.

For example, using the first icon being a video icon as an example, when wanting to check related recommended videos, a user may pull down a notification bar. With reference to FIG. 1, as shown in FIG. 4, the screen of the electronic device (that is, 31 in FIG. 4) displays a notification bar interface (that is, 32 in FIG. 4), and the notification bar interface 32 includes a second region (that is, 32a in FIG. 4) and a first region (that is, 32b in FIG. 4). The second region 32a displays three notification messages in the form of a list, and the first region 32b displays six video icons, namely, "Recommended video 1" to "Recommended video 6" video icons. If the user taps a "Weather" notification message, the electronic device displays an interface corresponding to the "Weather" notification message. If the user taps the "Recommended video 1" video icon, the electronic device displays a video interface corresponding to the "Recommended video 1".

Optionally, in this embodiment of the present application, when the first object is an application, the first icon may be an application icon of an application corresponding to the first icon, or may be an icon configured to trigger a shortcut of the application corresponding to the first icon, or may be another icon that can uniquely identify the application corresponding to the first icon, which may be specifically determined according to actual use requirements and is not limited in the embodiments of the present application.

Figure 5:
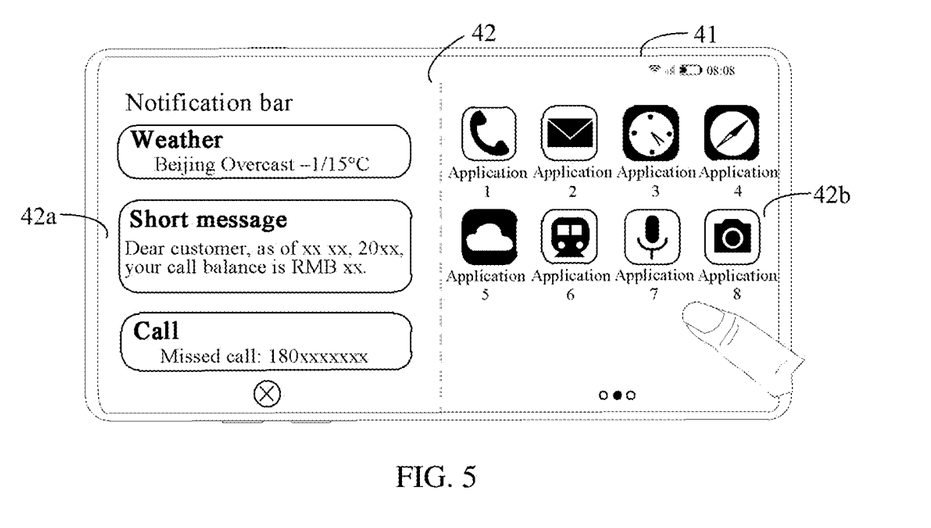
FIG. 5 is a schematic diagram 2 of an interface to which an interface display method is applied according to an embodiment of the present application.

For example, using the first icon being an application icon as an example, when wanting to check related recommended videos, a user may pull down a notification bar. With reference to FIG. 1, as shown in FIG. 5, the screen of the electronic device (that is, 41 in FIG. 5) displays a notification bar interface (that is, 42 in FIG. 5), and the notification bar interface 42 includes a second region (that is, 42a in FIG. 5) and a first region (that is, 42b in FIG. 5). The second region 42a displays three notification messages in the form of a list, and the first region 42b displays eight video icons, namely, "Application 1" to "Application 8" application icons. If the user taps a "Weather" notification message, the electronic device displays an interface corresponding to the "Weather" notification message. If the user taps the "Application 1" application icon, the electronic device displays a main interface of the "Application 1".

For example, the application may include: a portrait application and/or a landscape application.

It may be understood that the landscape application means that interfaces of some applications are only adapted to the electronic device in a landscape state. The portrait application means that interfaces of some applications are only adapted to the electronic device in a portrait state.

For example, the electronic device can switch from one landscape application to another landscape application in a case that the electronic device remains in the landscape state.

For example, the electronic device currently displays a main interface of a landscape application, and when a user wants to open another landscape application "Application 1", the user may pull down the notification bar. In this case, as shown in FIG. 5, the electronic device displays, in the first region 42*b*, entry Launchers of all applications that have been installed on the electronic device and that are adapted to the landscape state, that is, displays eight landscape application icons, namely, "Application 1" to "Application 8" application icon. The user may tap the "Application 1" application icon, and the electronic device directly switches to a main interface of the "Application 1".

In this way, when the electronic device is in the landscape state, application icons of all or some of landscape applications can be displayed through the notification bar interface, and the user may perform switching directly by tapping an application icon on the notification bar interface without exiting a current application, which alleviates the problem of cumbersome operations that exist in switching the electronic device between the landscape state and the portrait state back and forth introduced during switching of the landscape application.

In the interface display method provided in the embodiments of the present application, in a case that the electronic device is in a landscape state and displays a first interface of a first application, the electronic device displays a notification bar interface including a first region and a second region. Because the first region displays N first icons indicating a first object or first objects, and the second region is configured to display a notification message, the notification bar interface can further display icons in addition to retaining the original function of displaying a notification message, so that the notification bar interface is effectively utilized, thereby avoiding the problem of a low layout space utilization of an existing notification bar of an electronic device in a landscape state.

Optionally, in this embodiment of the present application, the electronic device may use the first region as an entry for multi-scenario interaction of other applications, that is, and icons corresponding to objects related to or the same as the interface content may be displayed in the first region, so that a user can enter another application by touching the icon.

For example, after step 202, the method may further include steps 203*a* and 203*b* as follows:

Step 203*a*: The electronic device receives a second input for a target first icon in the N first icons.

For example, the first object indicated by the target first icon is a second interface.

For example, the second interface is an interface adapted to the electronic device in the landscape state.

For example, the second input may include: a tap input performed by the user on the target first icon, or a swipe input performed by the user on the target first icon, or another feasible input performed by the user on the target first icon, which may be specifically determined according to actual use requirements, and is not limited in the embodiments of the present application.

Step 203*b*: The electronic device displays the second interface in the landscape state in response to the second input.

For example, the second interface may be an interface in the first application, or may be an interface in a second application, which is not limited in the embodiments of the present application.

For example, a conventional video playback interface is adapted to an electronic device in a portrait state by default, and a playback interface (that is, the second interface) adapted to the electronic device in a landscape state is displayed only after a user taps a "Full screen playback" key.

For example, the electronic device may search for related recommended objects in other applications connected to the first region and display the recommended objects in the first region. Alternatively, related recommended objects are searched for according to an application type of a currently working application in applications of the same type, and recommend and display the related recommended objects in the first region, which are not limited in the present application.

Example 1: When the electronic device is in the landscape state and plays a video a, the electronic device obtains video content (for example, lines or pictures) of the video a. Next, the electronic device may notify other video applications of the video content, search for recommended videos related to the video content in the other video applications, and then recommend and display the recommended videos to the user, that is, display video icons of the recommended videos in the first region of the notification bar interface. When wanting to check related recommended videos, the user may pull down the notification bar (that is, the first input). In this case, as shown in FIG. 4, the electronic device displays "Recommended video 1" to "Recommended video 6" video icons in the first region 32*b*. If the user taps the "Recommended video 1" video icon (that is, the second input), the electronic device may switch to a playback interface of the "Recommended video 1", and perform automatic playback.

Example 2: When the electronic device is in the landscape state and plays a video a. When wanting to check related recommended videos, the user may pull down the notification bar (that is, the first input). In this case, the electronic device may be triggered to obtain video content (for example, lines or pictures) of the video a. Next, the electronic device may notify other video applications of the video content, search for recommended videos related to the video content in the other video applications, and then recommend and display the recommended videos to the user, that is, display video icons of the recommended videos in the first region of the notification bar interface. As shown in FIG. 4, the electronic device displays "Recommended video 1" to "Recommended video 6" video icons in the first region 32*b*. If the user taps the "Recommended video 1" video icon, the electronic device may switch to a playback interface of the "Recommended video 1", and perform automatic playback.

It should be noted that while the user taps the "Recommended video 1" video icon, the electronic device may close the notification bar interface.

In this way, the electronic device can recommend related objects for the user according to interface content of a current interface, so that the user can quickly check the related objects and select a to-be-viewed object, and then open the object, so that all the operations are simple and fast.

Optionally, in this embodiment of the present application, the electronic device may further remove an existing icon before displaying the icons in the first region.

For example, before step 201*b*, the method may further include step 201*b*1 as follows:

Step 201*b*1: The electronic device removes, if the first region displays a second icon, the second icon in a case that the electronic device displays the first interface in the landscape state.

The second icon is configured to indicate a second object, and the second object is unrelated to the interface content of the first interface.

For example, the second object may include at least one of the following: an application, a multimedia file, or an image. For example, the multimedia file may be audio or a video.

For example, the second icon may be an icon configured to trigger a multimedia file corresponding to the second icon, or may be a thumbnail configured to trigger an image corresponding to the second icon.

For example, when the second object is an application, the second icon may be an application icon of an application corresponding to the second icon, or may be an icon configured to trigger a shortcut of the application corresponding to the second icon, or may be another icon that can uniquely identify the application corresponding to the second icon, which may be specifically determined according to actual use requirements and is not limited in the embodiments of the present application.

For example, when the electronic device is in the landscape state and plays a song a, the first region of the notification bar interface displays song icons of related recommended songs. After the user exits a playback interface of the song a, a playback interface of a video a is entered. When wanting to check related recommended videos, the user may pull down the notification bar (that is, the first input). In this case, the electronic device is triggered to obtain lines on the playback interface of the video a, and extract key words therefrom. Next, the electronic device may search for related recommended videos in other video applications by using the keywords. Before displaying video icons of the related recommended videos in the first region of the notification bar interface, the electronic device may first remove the song icons of the related recommended songs displayed in the first region. As shown in FIG. 4, the electronic device displays "Recommended video 1" to "Recommended video 6" video icons in the first region 32b.

Optionally, in this embodiment of the present application, the user may add an icon into the first region according to a need after the electronic device displays the notification bar interface.

For example, before step 202, the method may further include step 204 to step 207 as follows:

Step 204: The electronic device receives a third input for the first region.

For example, the third input for the first region may include: a tap input performed by the user on a screen, or a swipe input performed by the user on the screen, or another feasible input performed by the user on the screen, which may be specifically determined according to actual use requirements, and is not limited in the embodiments of the present application.

In an example, the third input may be an input performed by the user on the first region. For example, the third input is an input performed by the user on the blank area of the first region.

It should be noted that for the tap input and swipe input, refer to the descriptions of the first input in this application. Details are not described herein again.

Step 205: The electronic device displays an icon setting interface in response to the third input.

In this embodiment of the present application, the icon setting interface displays X third icons, a third icon is configured to indicate a third object, and X is a positive integer.

For example, the icon setting interface may be superimposed and displayed on the notification bar interface. For example, the icon setting interface may be superimposed and displayed on the notification bar interface at a first transparency. For example, if the first transparency is denoted as T1, then a value range of T1 may be 0%<T1<100%.

For example, the icon setting interface may be displayed at any position in the notification bar interface. A size of the icon setting interface may be a default size or may be set by the user flexibly.

For example, the third object may include at least one of the following: an application, a multimedia file, or an image. For example, the multimedia file may be audio or a video.

For example, the third icon may be an icon configured to trigger a multimedia file corresponding to the third icon, or may be a thumbnail configured to trigger an image corresponding to the third icon.

For example, when the third object is an application, the third icon may be an application icon of an application corresponding to the third icon, or may be an icon configured to trigger a shortcut of the application corresponding to the third icon, or may be another icon that can uniquely identify the application corresponding to the third icon, which may be specifically determined according to actual use requirements and is not limited in the embodiments of the present application.

Step 206: The electronic device receives a fourth input for a target third icon.

For example, the fourth input for the target third icon may include: a tap input performed by the user on the target third icon, or a swipe input performed by the user on the target third icon, or another feasible input performed by the user on the target third icon, which may be specifically determined according to actual use requirements, and is not limited in the embodiments of the present application.

It should be noted that for the tap input and swipe input, refer to the descriptions of the first input in this application. Details are not described herein again.

Step 207: The electronic device adds the target third icon into the first region in response to the fourth input.

In this embodiment of the present application, the target third icon is at least one of the X third icons.

Figure 6A:
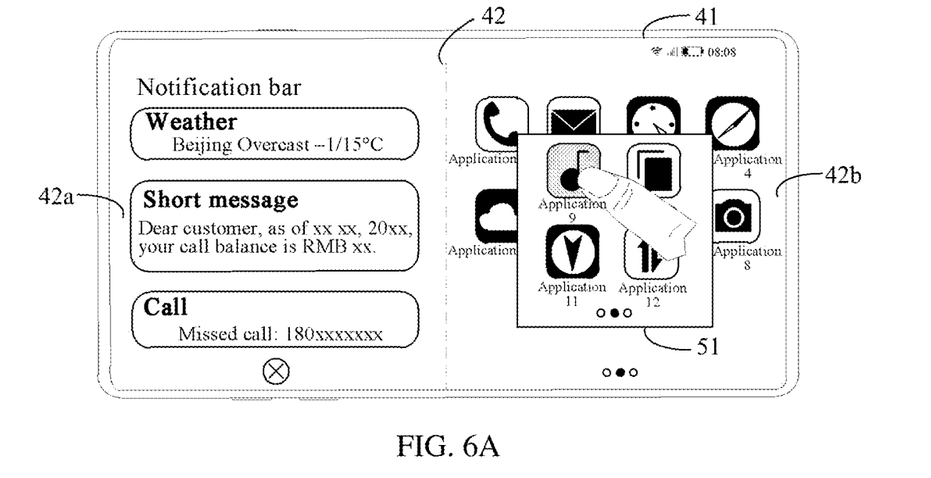
FIG. 6A is a schematic diagram 3 of an interface to which an interface display method is applied according to an embodiment of the present application.
Figure 6B:
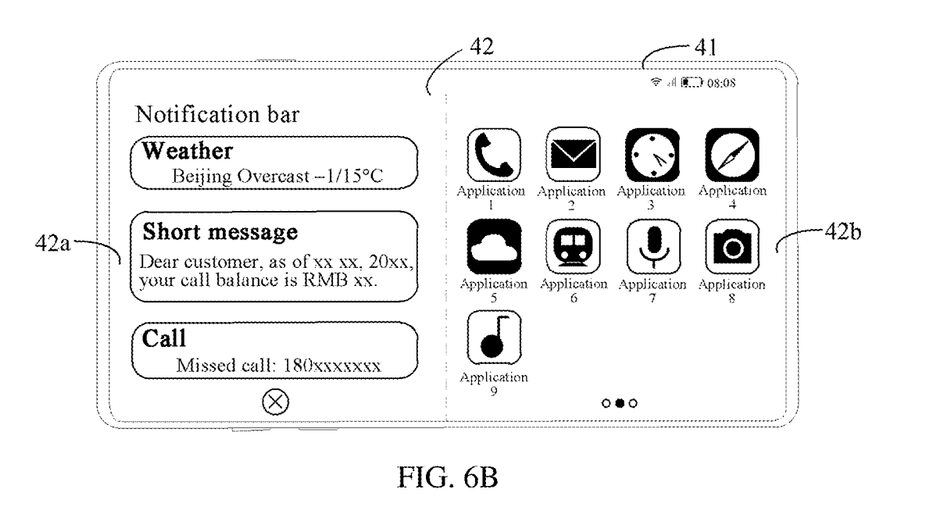
FIG. 6B is a schematic diagram 4 of an interface to which an interface display method is applied according to an embodiment of the present application.

For example, with reference to FIG. 5, when the user wants to add an application icon, the user may long-press the blank area of the first region 42b (that is, the third input), and when the user long-presses the blank area of the first region 42b, as indicated in FIG. 6A, the icon setting interface (that is, 51 in FIG. 6A) is superimposed on the notification bar interface 42, and four application icons (that is, the third icons) are displayed in the icon setting interface 51. The four application icons are respectively an "Application 9" application icon, an "Application 10" application icon, an "Application 11" application icon, and an "Application 12" application icon. Next, when choosing to add the application icon of "Application 9", the user can tap the "Application 9" application icon (that is, the target third identifier), as indicated in FIG. 6B, and the electronic device may add the "Application 9" application icon into the first region 42b.

In this way, the user may choose a to-be-added application icon in the icon setting interface according to preferences and requirements, so as to add an application icon of a to-be-used application into the first region, thereby improving the sense of human-computer interaction.

Optionally, in this embodiment of the present application, when the first region includes a plurality of applications, based on step 202, a solution provided in this embodiment of the present application may include step A1 as follows:

Step A1: The electronic device displays the notification bar interface in response to the first input, and displays the first icons in the notification bar interface according to use frequencies of all applications in a plurality of applications.

For example, when the electronic device displays the first icons in the notification bar interface, the first icons may be displayed in descending order according to the use frequencies of all the applications in the plurality of applications or may be displayed in ascending order according to the use frequencies of all the applications in the plurality of applications, which is not limited in the present application.

In this way, the electronic device may display the first icons according to use habits of the user, so that the user can quickly find an application that the user wants to use, thereby improving operation efficiency.

In addition, in this embodiment of the present application, the electronic device may further divide the notification bar interface into a first region and a second region in a case that the electronic device is in the portrait state, so that the layout of the notification bar interface of the electronic device in the portrait state can be further redesigned, which enriches interaction modes of the notification bar of the electronic device in the portrait state in different scenarios. For a specific implementation process, refer to the descriptions of the notification bar interface of the electronic device in the landscape state in this embodiment of the present application. Details are not described herein again.

Figure 7:
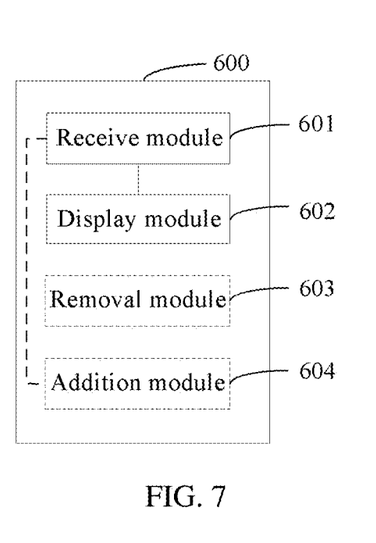
FIG. 7 is a schematic structural diagram 1 of an electronic device according to an embodiment of the present application.

FIG. 7 is a possible schematic structural diagram of implementing an electronic device according to an embodiment of the present application. As shown in FIG. 7, an electronic device 600 includes: a receive module 601 and a display module 602.

The receive module 601 is configured to receive a first input performed by a user in a case that an electronic device is in a landscape state and displays a first interface of a first application.

The display module 602 is configured to display a notification bar interface in response to the first input received by the receive module 601, and display N first icons in a first region, where the notification bar interface includes the first region and a second region, the second region is configured to display a notification message, a first icon is configured to indicate a first object, and N is a positive integer.

Optionally, the first object is related to interface content of the first interface.

Optionally, the receive module 601 is further configured to receive a second input for a target first icon in the N first icons, where a first object indicated by the target first icon is a second interface. The display module 602 is further configured to display the second interface in the landscape state in response to the second input received by the receive module 601.

Optionally, as shown in FIG. 7, the electronic device 600 further includes: a removal module 603. The removal module 603 is configured to remove, if the first region displays a second icon, the second icon, where the second icon is configured to indicate a second object, and the second object is unrelated to the interface content of the first interface.

Optionally, as shown in FIG. 7, the electronic device 600 further includes: an addition module 604. The receive module 601 is further configured to receive a third input for the first region. The display module 602 is further configured to display an icon setting interface in response to the third input received by the receive module 601, where the icon setting interface displays X third icons, and a third icon is configured to indicate a third object. The receive module 601 is further configured to receive a fourth input for a target third icon. The addition module 604 is configured to add the target third icon to the first region in response to the fourth input received by the receive module 601, where the target third icon is at least one of the X third icons, and X is a positive integer.

It should be noted that as shown in FIG. 7, a module that is necessarily included in the electronic device 600 is indicated by a solid line box, for example, the receive module 601, and a module that may not be included in the electronic device 600 is indicated by a dashed line box, for example, the addition module 604.

For the electronic device provided in the embodiments of the present application, in a case that a terminal device is in a landscape state and displays a first interface of a first application, the electronic device displays a notification bar interface including a first region and a second region. Because the first region displays N first icons indicating a first object or first objects, and the second region is configured to display a notification message, the notification bar interface can further display icons in addition to retaining the original function of displaying a notification message, so that the notification bar interface is effectively utilized, thereby avoiding the problem of a low layout space utilization of an existing notification bar of an electronic device in a landscape state.

The electronic device provided in this embodiment of the present application can implement various processes implemented by the electronic device in the method embodiments. To avoid repetition, details are not described herein again.

Figure 8:
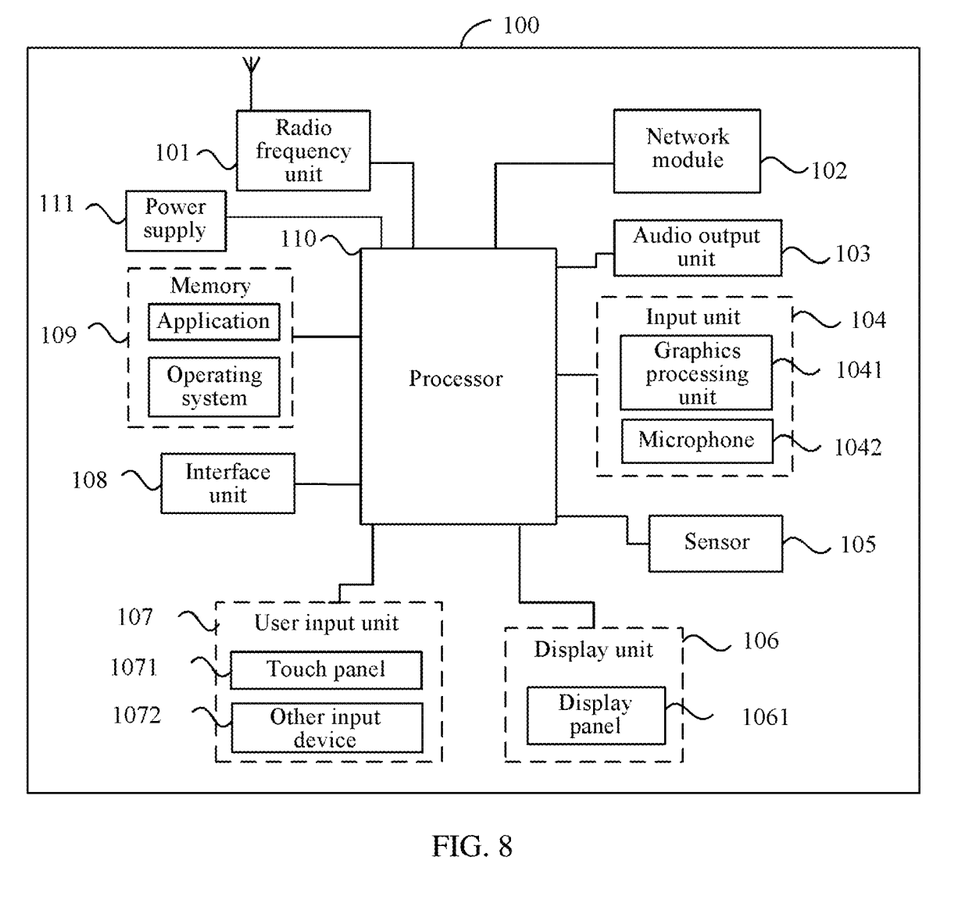
FIG. 8 is a schematic structural diagram 2 of an electronic device according to an embodiment of the present application.

FIG. 8 is a schematic diagram of a hardware structure of an electronic device 100 according to embodiment of the present application. The electronic device 100 includes, but is not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the electronic device 100 shown in FIG. 8 does not constitute a limitation to the electronic device. The electronic device 100 may include more or fewer components than those shown in the figure, or some components may be combined, or a different component deployment may be used. In the embodiments of the present application, the electronic device 100 includes, but is not limited to, a mobile phone, a tablet computer, a notebook computer, a palmtop computer, an in-vehicle electronic device, a wearable device, a pedometer, and the like.

The processor 110 is configured to control the user input unit 107 to receive a first input performed by a user in a case that the electronic device is in a landscape state and displays a first interface of a first application; and is further configured to control the display unit 106 to display a notification bar interface in response to the first input received by the user input unit 107, and display N first icons in a first region, where the notification bar interface includes the first region and a second region, the second region is configured to display a notification message, a first icon is configured to indicate a first object, and N is a positive integer.

For the electronic device provided in the embodiments of the present application, in a case that a terminal device is in a landscape state and displays a first interface of a first application, the electronic device displays a notification bar interface including a first region and a second region. Because the first region displays N first icons indicating a first object or first objects, and the second region is configured to display a notification message, the notification bar interface can further display icons in addition to retaining the original function of displaying a notification message, so that the notification bar interface is effectively utilized, thereby avoiding the problem of a low layout space utilization of an existing notification bar of an electronic device in a landscape state.

It should be understood that, in the embodiments of the present application, the radio frequency unit 101 may be configured to receive and transmit information or receive and transmit signals during a call. For example, after being received, downlink data from a base station is processed by the processor 110. In addition, uplink data is sent to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device through a wireless communication system and network.

The electronic device 100 provides wireless broadband Internet access for a user through the network module 102, for example, help the user to send and receive emails, browse webpages, and access stream media, and the like.

The audio output unit 103 may convert audio data received by the radio frequency unit 101 or network module 102 or audio data stored in the memory 109 into audio signals and output the audio signals as sounds. Moreover, the audio output unit 103 may further provide an audio output (for example, a call signal receiving sound or a message receiving sound) related to a specific function implemented by the electronic device 100. The audio output unit 103 includes a speaker, a buzzer, a receiver, and the like.

The input unit 104 is configured to receive an audio signal or a video signal. The input unit 104 may include a graphics processing unit (GPU) 1041 and a microphone 1042. The graphics processing unit 1041 processes image data of a static picture or a video obtained by an image capturing apparatus (for example, a camera) in a video capturing mode or an image capturing mode. An image frame that has been processed may be displayed on a display unit 106. The image frame that has been processed by the graphics processing unit 1041 may be stored in the memory 109 (or another storage medium) or sent by using the radio frequency unit 101 or network module 102. The microphone 1042 may receive a sound, and can process the sound into audio data. The processed audio data may be converted, in a phone call mode, into a format that may be sent to a mobile communication base station via the radio frequency unit 101 and be output.

The electronic device 100 further includes at least one sensor 105 such as an optical sensor, a motion sensor, and other sensors. Exemplarily, the optical sensor includes an ambient light sensor and a proximity sensor. The ambient light sensor may adjust luminance of the display panel 1061 according to brightness of the ambient light. The proximity sensor may switch off the display panel 1061 and/or backlight when the electronic device 100 is moved to the ear. As a type of motion sensor, an acceleration sensor can detect magnitudes of accelerations in various directions (generally, on three axes), may detect a magnitude and a direction of the gravity in a static state, and may be applied to recognizing an attitude of the electronic device (for example, switching between a landscape state and a portrait state, a related game, and magnetometer attitude calibration), a function related to vibration recognition (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, and the like, and details are not described herein.

The display unit 106 is configured to display information entered by the user or information provided for the user. The display unit 106 may include a display panel 1061. The display panel 1061 may be configured in the form of a liquid crystal display (LCD), an organic light-emitting diode (OLED), or the like.

The user input unit 107 may be configured to receive input digit or character information, and generate a keyboard signal input related to the user setting and function control of the electronic device 100. Exemplarily, the user input unit 107 includes a touch panel 1071 and another input device 1072. The touch panel 1071, also referred to as a touchscreen, may collect a touch operation of a user on or near the touch panel (such as an operation of a user on or near the touch panel 1071 by using any suitable object or attachment such as a finger or a touch pen). The touch panel 1071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 110, and receives and executes a command transmitted by the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. Exemplarily, the another input device 1072 may include, but not limited to, a physical keyboard, a functional key (such as a volume control key or a switch key), a track ball, a mouse, and a joystick, which is not described herein in detail.

Optionally, the touch panel 1071 may cover the display panel 1061. After detecting a touch operation on or near the touch panel 1071, the touch panel 1071 transfers the touch operation to the processor 110, to determine a type of a touch event. Then, the processor 110 provides a corresponding visual output on the display panel 1061 according to the type of the touch event. Although in FIG. 8, the touch panel 1071 and the display panel 1061 are used as two separate parts to implement input and output functions of the electronic device 100, in some embodiments, the touch panel 1071 and the display panel 1061 may be integrated to implement the input and output functions of the electronic device 100, which is not specifically limited herein.

The interface unit 108 is an interface between an external apparatus and the electronic device 100. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 108 may be configured to receive an input (for example, data information or power) from an external apparatus, and transmit the received input to one or more elements in the electronic device 100, or may be configured to transmit data between the electronic device 100 and the external apparatus.

The memory 109 may be configured to store a software program and various data. The memory 109 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 109 may include a high speed random access memory, and may further include a non-volatile memory, such as at least one magnetic disk storage device, a flash memory device or other non-volatile solid state storage devices.

The processor 110 is a control center of the electronic device 100, and connects to various parts of the electronic device 100 by using various interfaces and lines. By running or executing the software program and/or the module stored in the memory 109, and invoking data stored in the memory 109, the processor 110 performs various functions and data processing of the electronic device 100, thereby performing overall monitoring on the electronic device 100. Optionally, the processor 110 may include one or more processing units. Optionally, the processor 110 may integrate an application processor and a modem processor, where the application processor mainly processes an operating system, a user interface, an application program, and the like, and the modem processor mainly processes wireless communication. It may be understood that the foregoing modem may either not be integrated into the processor 110.

The electronic device 100 further includes the power supply 111 (such as a battery) for supplying power to the components. Optionally, the power supply 111 may be logically connected to the processor 110 by a power management system, thereby implementing functions, such as charging, discharging, and power consumption management, by using the power management system.

In addition, the electronic device 100 includes some function modules that are not shown, which is not described herein in detail.

Optionally, the embodiments of the present application further provide an electronic device, including a processor, a memory, and a computer program stored in the memory and executable on the processor 110, where when executed by the processor, the computer program implements respective processes of the embodiments of the interface display method, and can achieve the same technical effects. To avoid repetition, details are not described herein again.

The embodiments of the present application further provide a non-transitory computer-readable storage medium, storing a computer program, where when executed by a processor, the computer program implements respective processes of the embodiments of the interface display method, and can achieve the same technical effects. To avoid repetition, details are not described herein again. The non-transitory computer-readable storage medium is, for example, a read-only memory (ROM for short), a random access memory (RAM for short), a magnetic disk, or an optical disc.

It should be noted that terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may alternatively be implemented by using hardware, but the former is a better implementation in many cases. Based on such an understanding, the technical solutions in this application essentially or the part contributing to the related art may be implemented in the form of a software product. The computer software product is stored in a storage medium (for example, a ROM/RAM, a magnetic disk, or an optical disc), and includes several instructions for instructing an electronic device (which may be a smartphone, a computer, a server, an air-conditioner, a network device, or the like) to perform the method described in the embodiments of this application.

The embodiments of this application are described above with reference to the accompanying drawings. However, this application is not limited to the foregoing specific implementations. The foregoing specific implementations are merely illustrative rather than limitative. A person of ordinary skill in the art may derive various forms from this application without departing from the spirit of this application and the scope claimed by the claims, which are all under the protection of this application.

The invention claimed is:

1. An interface display method, comprising:
   receiving a first input in a case that an electronic device is in a landscape state and displays a first interface of a first application, wherein the first input is used to swipe down from a top edge of a screen to pull out a notification bar; and
   displaying, in response to the first input, a notification bar interface and N first icons in a first region, wherein
   the notification bar interface comprises the first region and a second region, the second region is configured to display a notification message, a first icon is configured to indicate a first object, and N is a positive integer;
   the first object is related to interface content of the first interface;
   after the displaying, in response to the first input, the notification bar interface and the N first icons in the first region, the method further comprises:
   receiving a third input for the first region;
   displaying an icon setting interface in response to the third input, wherein the icon setting interface displays X third icons, and a third icon is configured to indicate a third object;
   receiving a fourth input for a target third icon; and
   adding the target third icon to the first region in response to the fourth input, wherein the target third icon is at least one of the X third icons, and X is a positive integer.

2. The method according to claim 1, wherein after the displaying, in response to the first input, the notification bar interface and the N first icons in the first region, the method further comprises:
   receiving a second input for a target first icon in the N first icons, wherein a first object indicated by the target first icon is a second interface; and
   displaying the second interface in the landscape state in response to the second input.

3. The method according to claim 1, wherein before the displaying the N first icons in the first region, the method further comprises:
   removing, if the first region displays a second icon, the second icon in a case that the electronic device displays the first interface in the landscape state, wherein
   the second icon is configured to indicate a second object, and the second object is unrelated to the interface content of the first interface.

4. An electronic device, comprising a processor, a memory, and a computer program stored in the memory and executable on the processor, wherein when the computer program is executed by the processor, causes the electronic device to perform:
    receiving a first input in a case that an electronic device is in a landscape state and displays a first interface of a first application, wherein the first input is used to swipe down from a top edge of a screen to pull out a notification bar; and
    displaying, in response to the first input, a notification bar interface and N first icons in a first region, wherein
    the notification bar interface comprises the first region and a second region, the second region is configured to display a notification message, a first icon is configured to indicate a first object, and N is a positive integer;
    the first object is related to interface content of the first interface;
    the computer program, when executed by the processor, causes the electronic device to further perform:
        receiving a third input for the first region;
        displaying an icon setting interface in response to the third input, wherein the icon setting interface displays X third icons, and a third icon is configured to indicate a third object;
        receiving a fourth input for a target third icon; and
        adding the target third icon to the first region in response to the fourth input, wherein the target third icon is at least one of the X third icons, and X is a positive integer.

5. The electronic device according to claim 4, wherein the computer program, when executed by the processor, causes the electronic device to further perform:
    receiving a second input for a target first icon in the N first icons, wherein a first object indicated by the target first icon is a second interface; and
    displaying the second interface in the landscape state in response to the second input.

6. The electronic device according to claim 4, wherein the computer program, when executed by the processor, causes the electronic device to further perform:
    removing, if the first region displays a second icon, the second icon in a case that the electronic device displays the first interface in the landscape state, wherein
    the second icon is configured to indicate a second object, and the second object is unrelated to the interface content of the first interface.

7. A non-transitory computer-readable storage medium, storing a computer program, wherein when the computer program is executed by a processor of an electronic device, causes the electronic device to perform:
    receiving a first input in a case that an electronic device is in a landscape state and displays a first interface of a first application, wherein the first input is used to swipe down from a top edge of a screen to pull out a notification bar; and
    displaying, in response to the first input, a notification bar interface and N first icons in a first region, wherein
    the notification bar interface comprises the first region and a second region, the second region is configured to display a notification message, a first icon is configured to indicate a first object, and N is a positive integer;
    the first object is related to interface content of the first interface;
    the computer program, when executed by the processor, causes the electronic device to further perform:
        receiving a third input for the first region;
        displaying an icon setting interface in response to the third input, wherein the icon setting interface displays X third icons, and a third icon is configured to indicate a third object;
        receiving a fourth input for a target third icon; and
        adding the target third icon to the first region in response to the fourth input, wherein the target third icon is at least one of the X third icons, and X is a positive integer.

8. The non-transitory computer-readable storage medium according to claim 7, wherein the computer program, when executed by the processor, causes the electronic device to further perform:
    receiving a second input for a target first icon in the N first icons, wherein a first object indicated by the target first icon is a second interface; and
    displaying the second interface in the landscape state in response to the second input.

9. The non-transitory computer-readable storage medium according to claim 7, wherein the computer program, when executed by the processor, causes the electronic device to further perform:
    removing, if the first region displays a second icon, the second icon in a case that the electronic device displays the first interface in the landscape state, wherein
    the second icon is configured to indicate a second object, and the second object is unrelated to the interface content of the first interface.

\* \* \* \* \*